(12) United States Patent
Farland

(10) Patent No.: US 12,284,946 B2
(45) Date of Patent: Apr. 29, 2025

(54) RESILIENT ELASTOMERIC SINGLE PIECE BIASING CONNECTOR FOR JOINING TWO LAWN RAKES

(71) Applicant: Stephen V Farland, Castle Pines, CO (US)

(72) Inventor: Stephen V Farland, Castle Pines, CO (US)

( * ) Notice: Subject to any disclaimer, the term of this patent is extended or adjusted under 35 U.S.C. 154(b) by 0 days.

(21) Appl. No.: 18/884,409

(22) Filed: Sep. 13, 2024

(65) Prior Publication Data

US 2025/0081880 A1 Mar. 13, 2025

Related U.S. Application Data

(60) Provisional application No. 63/538,097, filed on Sep. 13, 2023.

(51) Int. Cl.
| | |
|---|---|
| *A01D 7/10* | (2006.01) |
| *A01D 7/00* | (2006.01) |
| *B25G 3/38* | (2006.01) |
| *F16C 11/04* | (2006.01) |

(52) U.S. Cl.
CPC ............ *A01D 7/10* (2013.01); *A01D 7/00* (2013.01); *B25G 3/38* (2013.01); *F16C 11/04* (2013.01)

(58) Field of Classification Search
CPC .. A01D 7/00; A01D 7/10; A01D 11/06; F16B 2/08; F16B 2/22; F16B 7/0433; F16B 7/044; F16B 7/046; B25G 3/38
See application file for complete search history.

(56) References Cited

U.S. PATENT DOCUMENTS

| | | | |
|---|---|---|---|
| 2,503,998 A | 4/1950 | Bussey | |
| 3,521,332 A * | 7/1970 | Kramer | F16L 3/13 248/912 |
| 3,688,484 A | 9/1972 | Cox | |
| 4,037,397 A | 7/1977 | Fiorentino | |
| 4,793,645 A * | 12/1988 | Decker | A01B 1/026 294/58 |
| 5,114,199 A | 5/1992 | Newcomer | |
| 5,459,988 A | 10/1995 | Glaser | |
| 5,564,266 A | 10/1996 | Laughlin | |
| 5,568,669 A * | 10/1996 | Godown | A45D 34/04 401/6 |
| 6,904,743 B2 | 6/2005 | Vodinh | |
| 7,168,230 B1 | 1/2007 | Waddell | |
| 7,661,258 B1 | 2/2010 | Petruzelli | |
| 9,924,630 B2 | 3/2018 | Kairys | |

(Continued)

FOREIGN PATENT DOCUMENTS

CN 205660652 U * 10/2016

*Primary Examiner* — Alicia Torres
(74) *Attorney, Agent, or Firm* — Leyendecker & Lemire, LLC

(57) ABSTRACT

The single piece connector is made from a tear resistant, and relatively high durometer elastomer, such as polyurethane. The connector has two adjacent bores separated by a common wall in which the shafts of two rakes can be firmly received. The connector's dimensions combined with the stiffness of the constituent material provide a significant restoritive biasing force when the rakes are pivoted relative to the connector that helps hold a load of scooped leaves between the associated rake heads as the head are maneuvered to a desired container for deposit.

15 Claims, 3 Drawing Sheets

(56) References Cited

U.S. PATENT DOCUMENTS

| | | | |
|---|---|---|---|
| 2003/0033793 A1* | 2/2003 | Fairbanks | A01D 7/10 56/400.1 |
| 2020/0305359 A1 | 10/2020 | Oakes | |
| 2021/0251134 A1 | 8/2021 | Greco | |
| 2022/0248598 A1 | 8/2022 | Besler | |
| 2022/0304256 A1 | 9/2022 | Coneron | |
| 2024/0357977 A1* | 10/2024 | O' Neal | A01D 7/10 |

* cited by examiner

RESILIENT ELASTOMERIC SINGLE PIECE BIASING CONNECTOR FOR JOINING TWO LAWN RAKES

RELATED REFERENCES

This application claims the benefit of and fully incorporates by reference U.S. provisional patent application 63/538,097 filed on Sep. 13, 2023 having the same title and inventorship as this application.

BACKGROUND

When the leaves fall from the trees in autumn, many homeowners are faced with the task of raking up the leaves from their lawns and depositing in trash bags for disposal. While raking the leaves into a large pile is usually easy enough, moving the leaves from the piles into trash cans and trash bags can be challenging and arduous. While a lawn rake is great for making the piles, it is typically not very good for scooping up the piled leaves and depositing them in the desired receptacle.

Pivoting connectors are known that can be used to join two rakes together to form a set of rake tongs, wherein a user can ostensibly easily scoop large quantities of leaves between the opposing tines of two rakes, but in practice these connectors have not lived up to the promise. Connectors have been proposed made of a rubber material but they have tended to form a rather loose connection that do not provide the desired support to securely hold the rakes together and they do not provide any significant biasing force to encourage the closure of the rake tines around a load of leaves helping hold the leaves in place as the loaded tongs are maneuvered over the desired receptacle. They also tend to stretch and degrade quickly requiring relatively frequent replacement.

Other connectors that comprise sections that clamp on to the shafts of the respective rakes and are coupled together by way of a mechanical pivot mechanism are also known. Some of these devices may also comprise a leaf or coil spring to bias the rake tine sections into a closed position. The devices tend to be relatively complex having many pieces that have to be joined together. The pivot bearing surfaces in particular can be highly stressed and subject to premature failure. Even if sufficiently robust, the many parts and assembly of those parts into a pivoting connector system drives up the cost of these connector systems significantly.

DESCRIPTION

Overview

Embodiments of the present invention comprise a single piece connector made from a robust, thick, tough, resilient, and relatively high durometer elastomer, such as polyurethane. The dimensions combined with the stiffness of the constituent material provides both a firm connection between two rakes and a significant biasing force that helps hold a load of scooped leaves between the associated rake tongs as the tongs are maneuvered to a desired receptacle for deposit. The one-piece construction facilitates economical manufacture as well as eliminating the failure points of multi-part connector systems.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive, rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front, lateral, outwardly, and upwardly are relative to each other and are dependent on the specific orientation of an applicable element or article, and are used accordingly to aid in the description of the various embodiments and are not necessarily intended to be construed as limiting.

Unless otherwise indicated or dictated by context, the terms "approximately" and "about" mean +−20%. Unless otherwise indicated or dictated by context, the term "substantially" means +−10%. The term "generally" means for the most part.

The terms "shaft" and "handle" as pertaining to a rake are used interchangeably herein.

An Embodiment of an Elastomeric Rake Connector

Figure 1:
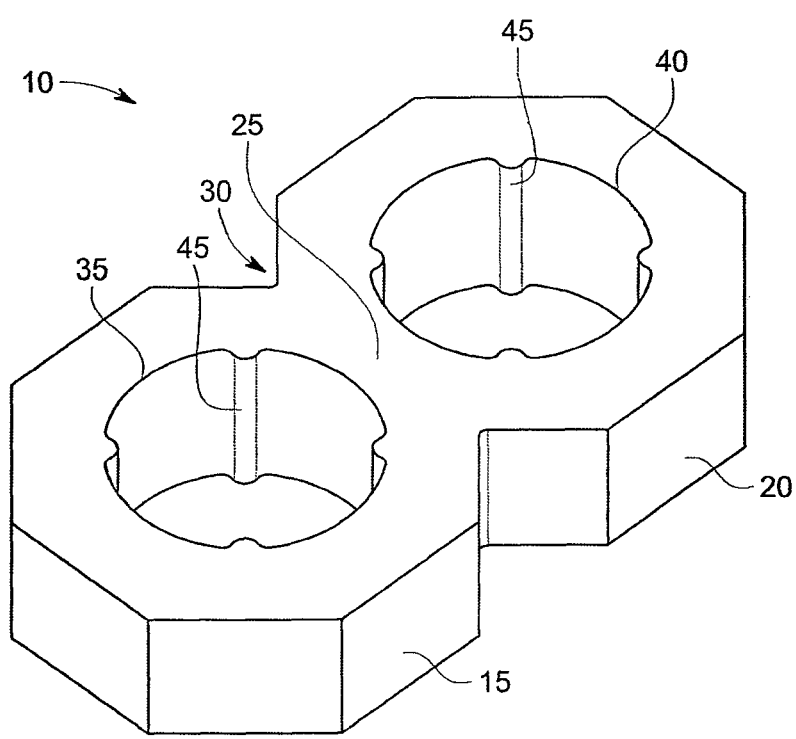
FIG. 1 is an isometric illustration of an elastomeric rake connector according to an embodiment of the present invention.
Figure 2:
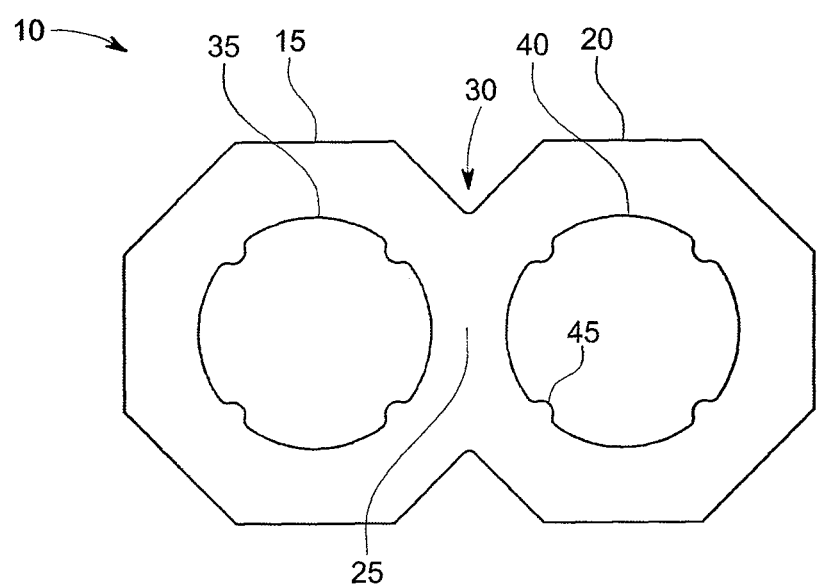
FIG. 2 is a top view of the elastomeric rake connector according to the embodiment of the present invention.

FIGS. 1-2 illustrate various views of an embodiment of an elastomeric rake connector 10. The connector is made of a high durometer elastomeric material in a form generally resembling a "FIG. 8" with two adjacent rake handle-receiving bores 35 & 40 substantially 1.08" in diameter positioned at least substantially 0.35" apart by a common wall 25. The common wall typically has V-shaped ends 30 with radiuses of at least 0.060". The connector comprises generally planar top and bottom surfaces, which are spaced about 0.625" apart from each other. The portions surrounding each of the bores form a plurality of walls, such as walls 15 & 20, which are common only to one bore (i.e. "uncommon walls"), and common wall 25 in the form of a generally octagonal shape, although variations having other shapes, such as circular are known.

Notably, each bore 35 & 40 includes four spaced of axially-extending, inwardly-protruding ridges 45 spaced and distributed along the inside of the bores. In one embodiment, the ridges extend inwardly towards the axis of the associated bore. The ridges help to grip and hold the connector in place on a handle of a rake.

The connector 10 is molded as a single piece from a high durometer elastomer, typically polyurethane. The polyurethane used in at least one embodiment has a durometer of about 75A classifying it as a hard rubber or hard elastomer. Table A below provides typical mechanical properties of the polyurethane used in embodiments of the connector. It exhibits very high strength, tear resistance, and modulus while at the same time having very high elastic elongation (>500% elongation as ASTM test D412) making it eminently suitable for a living hinge application where it can be repeatedly elastically deformed without suffering premature failure due to tearing or losing resilience. Importantly, an elastomeric material having split tear strength using ASTM test D470 of at least 65 is preferred with at least 70 more preferred and at least 75 most preferred. Similarly, an elastomeric material having a die C tear strength using ASTM test D624 of at least 255 is preferred with at least 275 more preferred and at least 295 most preferred.

TABLE A

TYPICAL PHYSICAL PROPERTIES FOR POLYURETHANE
FORMULA: Standard 75A Durometer

| | | ASTM TEST |
|---|---|---|
| HARDNESS | 73A | D2240 |
| TENSILE MODULUS (PSI) | | |
| 100% ELONGATION | 375 | D412 |
| 200% ELONGATION | | D412 |
| 300% ELONGATION | 535 | D412 |
| TENSILE STRENGTH (PSI) | 4500 | D412 |
| ELONGATION AT BREAK (%) | 750 | D412 |
| TEAR RESISTANCE (lb./in.) | | |
| DIE C | 295 | D624 |
| SPLIT | 75 | D470 |
| TROUSER | | D1938 |
| COMPRESSION SET (%) | 35 | D395B |
| REBOUND (%) | 35 | D2632 |

Other suitable elastomeric materials can also be utilized that have a high durometer (about 70 A-80 A) and similar or superior mechanical properties. It is further understood that the dimensions of the connector 10 can be adjusted for use with different elastomeric materials with different mechanical properties provided the dimensions of the connector are adjusted accordingly to provide similar operational functionality. For instance, if a slightly less stiff lower durometer elastomer is used, thicker and more stout dimensions may be specified to provide a connector having similar performance.

The dimensions of the connector 10 and in particular the ⅝" spacing between the top and bottom surfaces of the connector combined with the minimum 0.35" width or thickness of the common wall 25 and uncommon walls 15 & 20, give the connector substantial overall stiffness as well as high resiliency when consisting essentially of an elastomeric material having properties described herein. Accordingly, when the connector is twisted or pivoted as the heads of joined rakes are pivoted apart from one another, a return biasing force is exerted by the deformed connector. This biasing force assists in holding a load of debris between the heads of a rake in use.

As mentioned, each of the bores 35 & 40 are typically just over 1" in diameter (substantially 1.08"), which makes it easier to slide the connector 10 along a typical rake handle, which has a typical diameter of 1.0", to a desired position when compared to connectors having bores the same diameter or slightly smaller than the associated rake handle. Further, because some polyurethane and other elastomeric materials can exhibit a high coefficient of friction especially on smooth surfaces thereof, the plurality of axial ridges 45 spaced about the inside diameter surface of the bores 35 & 40 can help prevent the smooth sides of the bores from sticking to the rake handle as it is slid there along to position it.

In the illustrated embodiment, the ridges 45 extend in a direction that is essentially parallel to the axis of their associated bore 35 & 40. As can be appreciated, the linear ridges can be canted relative to the axis or even curved in other embodiments and variations. For instance in some variations the ridges can be helical. The cross-sectional shape of the ridges is generally triangular with a radiused peak, although the shape can also vary in other embodiments. The ridges protrude inwardly from the inside surface of the bores substantially 0.050" to 0.10", such that a diameter of a circle formed that touches the peaks of the ridges is typically substantially 0.93". Because the distance between the ridges is less than the typically diameter of a rake shaft received therein, the ridges deform elastically conforming to the shaft to help hold the shaft in place once positioned. The ridges act to provide resistance to the twisting of the rake shafts in the connector during use, as well as, help hold the connector in its desired axial locations on the shafts.

The connector is typically made as a single piece typically through casting and reaction injection molding, or injection molding depending on whether a thermoset or thermoplastic material is utilized. Polyurethanes of both types are known. Cast parts made are made with a relatively low viscosity liquid thermoset resin that is mixed with a curing agent or catalyst and then poured into a mold prior. Rejection injection molding is similar to casting except that the liquid resin is typically of a higher viscosity and it injected into the mold. While in the mold, the thermoset elastomer polymerizes into a solid. When a thermoplastic resin is utilized, it is heated to beyond its melting point and injected under pressure into a mold wherein it cures into a solid. As applicable, other manufacturing techniques may be utilized to make a single piece connector.

Methods of Using Embodiments of the Connector

Figure 3:
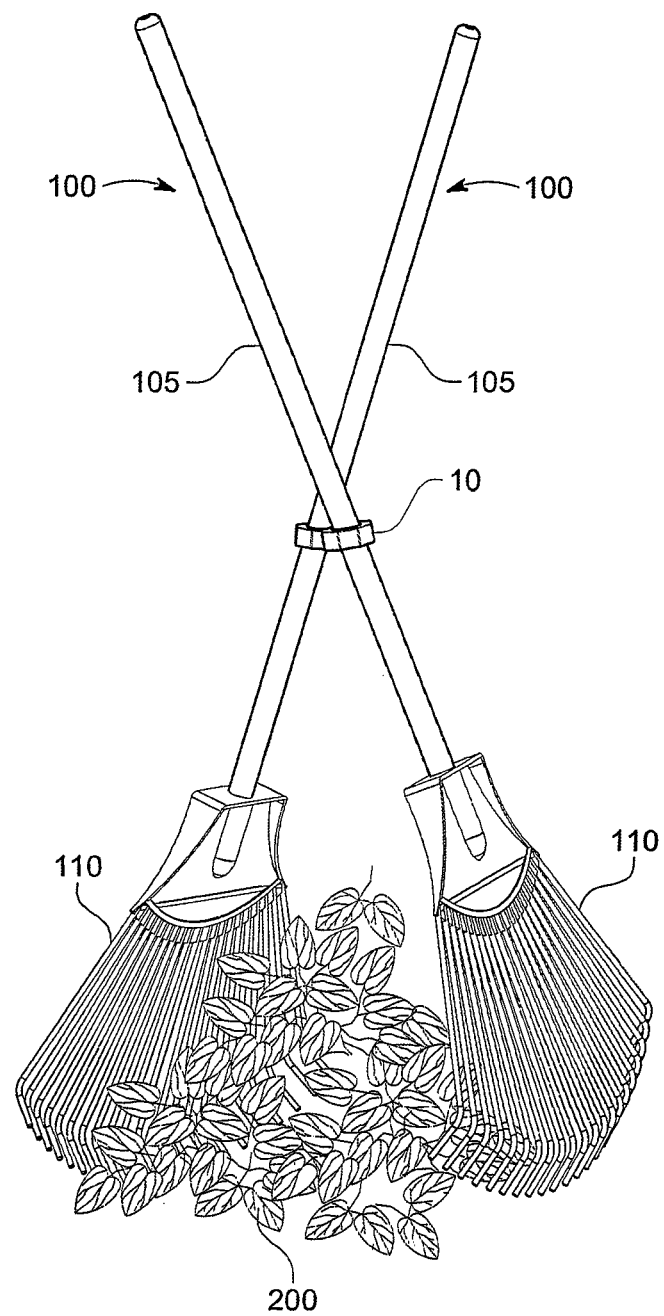
FIG. 3 is an isometric illustration of the elastomeric rake connector attached to a pair of rakes for use in scooping up leaves and other outdoor and garden debris according to the embodiment of the present invention.

FIG. 3 shows the connector 10 installed on a pair of lawn rakes 100. Each rake includes an elongated handle 105 (or shaft) and a head 110 that typically includes a plurality of arrayed tines.

To install the connector 10, each bore 35 & 40 is slid down over the shaft 105 from the top end thereof until reaching a desired pivot location on each shaft, which is typically about 4-14" above the top of the rake heads depending on the preference of the user. As can be appreciated and as mentioned above, the axially ridges 45 keep the smooth inside surfaces of the bores from frictionally sticking to the smooth surface of the shafts while the connector is slid down the shafts. Once in position, the compressed ridges also help hold the connector in place on the shafts.

By holding the shafts near their top ends one in each hand, a user can pivot the pair of rakes 100 at the connector 10 causing the heads 110 of the rakes to move towards and away from each other. Normally, in its resting state the two rakes are positioned generally parallel to each other with the connector being substantially unstressed save for the compression of the axial ridges 45. As the handles 105 are moved apart from each other the connector twists largely about the common wall 25 causing it to resiliently deform. Because of the particular dimensions of the connector and the relative hardness and modulus of the elastomer from which it is made, a biasing force is applied by the connector that urges the connector, and consequently, the rakes and rake heads back towards their resting configuration.

To use the rake and connector combination to pick up yard debris, such as a pile of raked leaves or grass, a user holding the handles 105 above the connector moves them apart causing the rakes to pivot about the connector thereby also separating the heads 110 relative to each other. The separated heads are then lowered over and onto a pile of debris. Next, while gently pushing the tined heads into the pile, the user moves the handles towards each thereby causing the rakes to pivot again and the heads to close about the debris capturing some or all of the pile therebetween. As the user holds the shafts of the rakes together securing the debris in-between the tine sections, he/she can lift the rake with its load and move it over to a desired receptacle, such as a trash can or trash bag. Finally, the user positions the captured debris over the desired receptacle and releases the debris into the receptacle by moving the handles apart, which causes the heads to separate. The process is repeated until substantially all of the leaves, grass or other yard debris has been moved. The entire process can be carried out by a user while standing substantially upright without the user having to bend over, thereby greatly reducing the potential strain on a user's back.

Rakes joined by a connector 10 can also be used to rake leaves and other debris without having to be separated from one another. A user can rotate one of the rakes 100 within its bore of the connector until the tines of its head 110 nest with the tines of the head of the other rake. In this configuration the rakes can be used to effectively create piles of leaves and grass wherein configuring the rakes for scooping the piles into containers only requires the rotation of one rake 180 degrees in the connector.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

The connector is described herein as being used with a pair of rakes. It is to be appreciated that is can also be used with other lawn and yard tools that have a long slender shaft as well. For instance, in one alternative combination a pair of shovels can be joined. In another combination a shovel, such as a snow-type shovel, can be joined with a rake. As can be appreciated the relative dimensions of the bores, the axial ridges and the walls of the connector can vary depending on the diameter of the shafts or handles of the yard tools it is to be used. Variations are also contemplated wherein indicia such as the name of the product or the name of a sponsoring company are molded into the surface thereof in either positive or negative relief. The color of the connector can be any suitable color, although in some variations the connector is brightly colored, such as safety orange, to make it more easier to locate when needed.

I claim:

1. A connector for joining the elongated shafts of two lawn and garden tools, the connector consisting essentially of a single piece of elastomeric material having a durometer of about 70 A-80 A and a die C tear strength of at least 255, wherein the connector comprises i) generally planar top and bottom surfaces spaced apart about 0.625", (ii) two adjacent bores extending between the top and bottom surfaces, the bores being separated by a common wall having a minimum thickness of 0.35", each bore including three or more ridges with each ridge protruding inwardly from an inside diameter surface of the respective bore substantially 0.05-0.10", the connector being configured to resiliently deform in use to permit the two lawn and garden tools to pivot relative to each other and exert a restorative biasing force.

2. The connector of claim 1, wherein the connector is generally in the shape of a figure eight.

3. The connector of claim 1, wherein the connector comprises a polyurethane with a durometer of about 75 A.

4. The connector of claim 1, wherein the diameter of each bore is substantially 1.08".

5. The connector of claim 1, wherein the three or more ridges are axially-extending.

6. The connector of claim 5, wherein the three or more ridges are evenly spaced about the circumference of the inside diameter surface of the respective bore.

7. The connector of claim 1, wherein the minimum thickness of uncommon walls surrounding the respective bores is about 0.35".

8. The connector of claim 1, wherein walls surrounding each bore form a generally octagonal outer surface generally surrounding the bore.

9. The connector of claim 1, wherein the top and bottom ends of the common wall are V-shaped with a base of each V-shaped end being radiused.

10. The connector of claim 9, wherein a radius of each base of each V being at least about 0.06".

11. The connector of claim 1 in combination with first and second rakes, the first rake having a first shaft received in one bore of the two adjacent bores, and the second rake having a second shaft received in the other bore of the two adjacent bores, each rake including a head comprising an array of tines.

12. The combination of claim 11, wherein the connector is frictionally received on each of the first and second shafts at a location 4-14" above the top of the head of each respective rake.

13. A method of using the combination of claim 11, the method comprising:
 while holding the first and second shafts generally near tops thereof, moving the shafts away from each other thereby resiliently deforming the connector and pivoting the respective shafts at the connector causing the respective heads to move away from each other to an open head position;
 while holding the first and second shafts generally near tops thereof and while in the open position, lowering the heads and tines over a pile of debris; and
 while holding the first and second shafts generally near tops thereof, moving the shafts towards each other pivoting the respective shafts at the connector causing the respective heads to move towards each other to a closed head position with at least some of the pile of debris contained between the respective tines.

14. The method of claim 13, further comprising:
with at least some debris contained between the respective tines in the closed head position, moving the combination to position the respective heads over a container;
while over the container, moving the respective heads into the open head position to release the at least some debris into the container.

15. A connector for joining the elongated shafts of two lawn and garden tools, the connector consisting of a single piece of polyurethane material having a durometer of about 75 A, wherein the connector comprises (i) generally planar top and bottom surfaces spaced apart about 0.625", (ii) adjacent first and second bores with respective diameters of substantially 1.08" separated by a common wall with each bore further encircled by uncommon walls, (iii) the common wall and uncommon walls have a minimum thickness of substantially 0.35", (iv) each of the first and second bores includes three or more axially-extending ridges that protrude inwardly from an inside diameter surface of the respective bore 0.05" to −0.10", the connector being configured to resiliently deform in use to permit the two lawn and garden tools to pivot relative to each other and exert a restorative biasing force.

* * * * *